United States Patent [19]

Peter

[11] 3,903,417

[45] Sept. 2, 1975

[54] DEVICE FOR MAINTAINING CONSTANT THE AMPLIFICATION OF A PHOTOELECTRIC TRANSDUCER DEVICE

[75] Inventor: Fritz Peter, Erlangen, Germany

[73] Assignee: Siemens Aktiengesellschaft, Munich, Germany

[22] Filed: Oct. 15, 1973

[21] Appl. No.: 406,248

[30] Foreign Application Priority Data
Oct. 25, 1973  Germany............................ 2252353

[52] U.S. Cl. ................. 250/369; 250/361; 250/363
[51] Int. Cl. ............................................. G01t 1/20
[58] Field of Search ........... 250/361, 363, 366, 368, 250/369, 458

[56] References Cited
UNITED STATES PATENTS

| | | | |
|---|---|---|---|
| 2,700,108 | 1/1955 | Shamos | 250/369 |
| 2,900,513 | 8/1959 | Duffy | 250/369 |
| 3,056,885 | 10/1962 | Scherbatskoy | 250/363 |
| 3,133,219 | 5/1964 | Gunther et al. | 250/458 X |
| 3,594,577 | 7/1971 | Loveday | 250/369 |

*Primary Examiner*—Archie R. Borchelt
*Attorney, Agent, or Firm*—V. Alexander Scher

[57] ABSTRACT

A device for maintaining constant the amplification of a photoelectric transducer device includes a beta light which supplies uniform light to the inlet of the transducer device, a circuit comparing the direct voltage outgoing signal of the transducer device produced by the beta light with a rated value signal embodying the rated value of the amplification and means varying the amplification so as to balance the direct voltage outgoing signal with the rated value signal.

3 Claims, 6 Drawing Figures

DEVICE FOR MAINTAINING CONSTANT THE AMPLIFICATION OF A PHOTOELECTRIC TRANSDUCER DEVICE

This invention relates to a device for maintaining constant the amplification of a photoelectric transducer device, particularly in nuclear medical instruments.

The amplification of a photoelectric transducer device is subjected to variations even when all operating voltages are held constant. It depends upon the temperature, changes with the intensity of supplied rays and is subjected to fatigue manifestations. It is thus necessary to examine the amplification from time to time and to set it again, namely to again calibrate the photoelectric transducer device at certain time intervals or continuously during the operation.

Several switching devices are known for the calibration of photoelectric transducer devices. These switching devices are all of complicated construction and increase substantially the costs of the apparatus wherein the transducer is used. Furthermore, the calibration is often complicated and consumes a great deal of time.

The precise maintaining of the rated value of the amplification is particularly important when a photoelectric transducer device is used in connection with a scintillator in a ray diagnosis device. In that case it is known for an impulse spectrum containing a narrow peak of high intensity to determine by a discriminator the difference of number rates of two channels which correspond to spectral portions located on both sides of the peak. A voltage corresponding to this difference influences the amplification of the photoelectric transducer device so as to equalize the two number rates. There is the drawback of a great switch technical expenditure and in addition such a peak is not always present in the impulse spectrum and thus often it is necessary to create it by a radioactive calibrating source. However, this has a detrimental effect upon the actual spectrum which is being examined.

The publication "Nuclear Instruments and Methods" 10 (1961), pages 234–236, describes a device for amplification regulation wherein a uniform light source is used which illuminates the photocathode of the photoelectric transducer device. The deviation of the anode direct current from a predetermined value is used for setting the supply voltage of the photoelectric transducer device. The uniform light source is a glow lamp supplied from a feeding device which keeps constant the feed voltage. This feeding device also requires a comparatively large switch-technical expenditure. Furthermore, the brightness of the glow lamp can be changed through aging, and then erroneous regulations of the amplification of the photoelectric transducer device are produced.

An object of the present invention is to produce a device of the above-described type which in comparison to prior art has a considerably simpler switch structure, and wherein a changing brightness of the uniform light source does not result in an erroneous regulation of the amplification.

Other objects of the present invention will become apparent in the course of the following specification.

In the accomplishment of the objectives of the present invention it was found advisable to provide the device of the present invention with a beta light which supplies uniform light to the inlet of the photoelectric transducer device, a circuit comparing the direct voltage outgoing signal of the transducer device produced by the beta light with a rated value signal embodying the rated value of the amplification and means varying the amplification so as to balance the direct voltage outgoing signal with the rated value signal.

A beta light contains a radioactive gas, for example, tritium and a glass container the inner surface of which is coated by a luminous body, for example, phosphorus. The beta rays produced by this gas (electrons) excite the luminous layer to produce light. A beta light does not need its own energy supply. Its life duration is more than 20 years. The brightness diminishes in accordance with the breakdown of radioactive gas. Since the time of this breakdown is known according to the present invention the diminution of brightness in time can be considered. A very simple construction provides a very great constancy of amplification of a photoelectric transducer device.

According to an embodiment of the invention an adjustable screen is provided between the beta light and the transducer which normally interrupts the light. A key is used for moving the screen into a position in which the light flow is freed. In this construction of the present invention the key is quickly actuated for setting, namely, for regulating amplifying changes. During normal operation the transducer device is not burdened by the beta light. Within the framework of the present invention, when the transducer device is used to receive scintillations in a scintillation crystal a sieve member is connected to the outlet of the transducer device for separating the direct voltage signal from the scintillation signal. In that case a continuous regulation of amplification changes can also take place. When a device of the present invention is used with a gamma camera having a plurality of photo amplifiers coupled over a light conducting system for scintillations in a scintillation crystal, the rated value signal for each transducer can be adjusted individually. In this manner it is possible to balance non-uniform illuminations of the inlet screen when the beta light sends rays to the inlet screen of the image amplifier.

The invention will appear more clearly from the following detailed description when taken in connection with the accompanying drawings showing by way of example only, preferred embodiments of the inventive idea.

Figure 1:
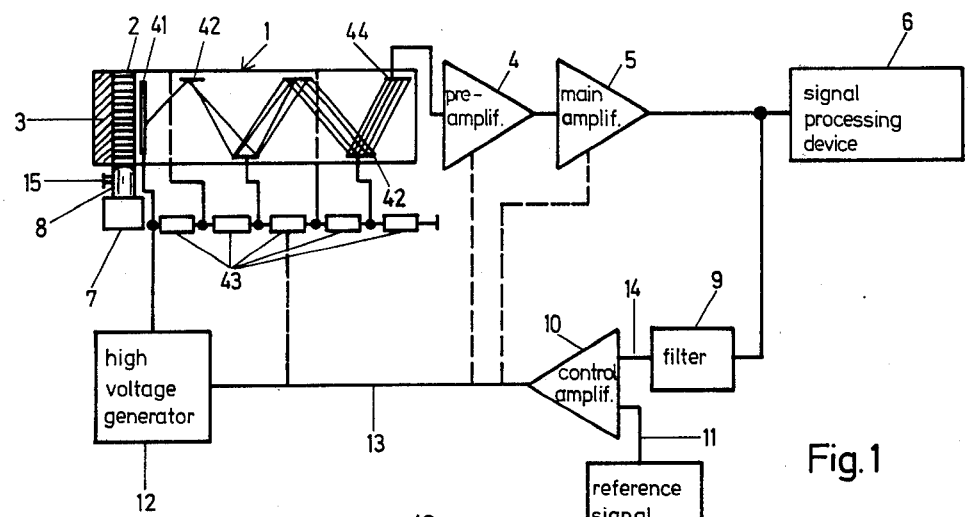
FIG. 1 is a circuit diagram of a device of the present invention having a single photo multiplier and a scintillation crystal connected in front of it.

FIG. 1 shows diagrammatically a photo multiplier 1 coupled by a light conducting system 2 to a scintillation crystal 3. The photo multiplier 1 contains a photo cathode 41 subjected against ground to a negative acceleration voltage (from 700 to 1000 v.). Within the multiplier there is a number of inclined opposed dynodes 42. They are connected to a voltage divider 43 in such manner that a positively increasing gradient is provided. The anode 44 is connected with the inlet of a preamplifier 4.

If light directed upon the photocathode 41 and coming through the crystal 3 releases some electrons out of the cathode, they are accelerated toward the first dynode and released thereby striking new secondary electrons. These are accelerated toward the second dynode and again by striking increase the flow of electrons. This procedure is repeated up to the anode 44.

The devices 1 to 3 are used, for example, to indicate radioactive rays proceeding from a patient.

The preamplifier 4 transmits the outgoing signals of the photo multiplier 1 through a main amplifier 5 to a signal treating device 6. The signal treating device 6 can be, for example, a known scintigram printer. Its construction is known and is not important for the objects of the present invention.

Light emerging from a beta light is transmitted through a screen device 8 and the light conducting system 2 to the inlet of the photo multiplier 1. The screen device 8 can be provided with replaceable screens or with an adjustable screen. Due to this arrangement an adaptation of the brightness of the used beta light can take place and the loss in brightness of the beta light due to the half value time of the radioactive gas of the beta light can be balanced. The beta light is located in a box 7. The outgoing signal of the main amplifier 5 is supplied to a sieve member 9 which forms the actual value signal for a regulating amplifier 10. At the rated value inlet 11 of the regulating amplifier 10 lies a signal corresponding to the amplification of the photo multiplying device 1, 4, 5. FIG. 1 also shows a high voltage generator 12 for the photo multiplier 1, which can be a high voltage transformer.

For gaging the photo multiplying device 1, 4, 5, namely, for setting the amplification to the desired value, the screen 8 is opened by the gaging key 15, so that beta light projects upon the inlet of the photo multiplier 1. The direct voltage signal at the outlet of the main amplifier 5 which comes from the beta light is separated by the sieving member 9 from the total outgoing signal of the main amplifier 5 and is compared in the control amplifier 10 with the rated value signal at the inlet 11. When one of these signals deviates from the other the control amplifier 10 produces a change in the amplification of the photo multiplying device 1, 4, 5 so as the balance the actual value of the direct voltage signal at the inlet 14 with the rated value at the inlet 11. This takes place by a corresponding high voltage change through the line 13. Thus the amplification of the photo multiplier 1 greatly depends upon the operational high voltage. For voltages between 700 to 1000 v. the electronic amplification is between 100,000 and 800,000.

As indicated by broken lines in FIG. 1 the change in the amplification of the photo multiplier device 1, 4, 5 according to the present invention can also take place in that the control amplifier 10 acts upon the preamplifier 4 or the main amplifier 5 or causes a change of a dynode voltage by changing a resistance of the voltage divider 43.

Figure 2:
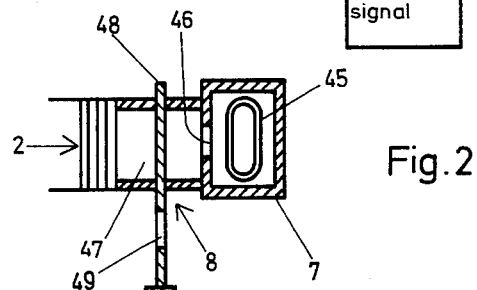
FIG. 2 is a sectional view of a detail.

FIG. 2 shows a beta light 45 constructed in the illustrated known manner and located in a box 7. It sends light through an opening 46 and a tube 47 into the light conducting system 2 and thus upon the photocathode 41. A slide 48 is used to close the tube 47. It has an opening 49 and carries the key 15. In the calibrating position of the slide 48 the opening 49 provides a flow of light from the beta light 45 to the light conducting system 2.

Figure 3:
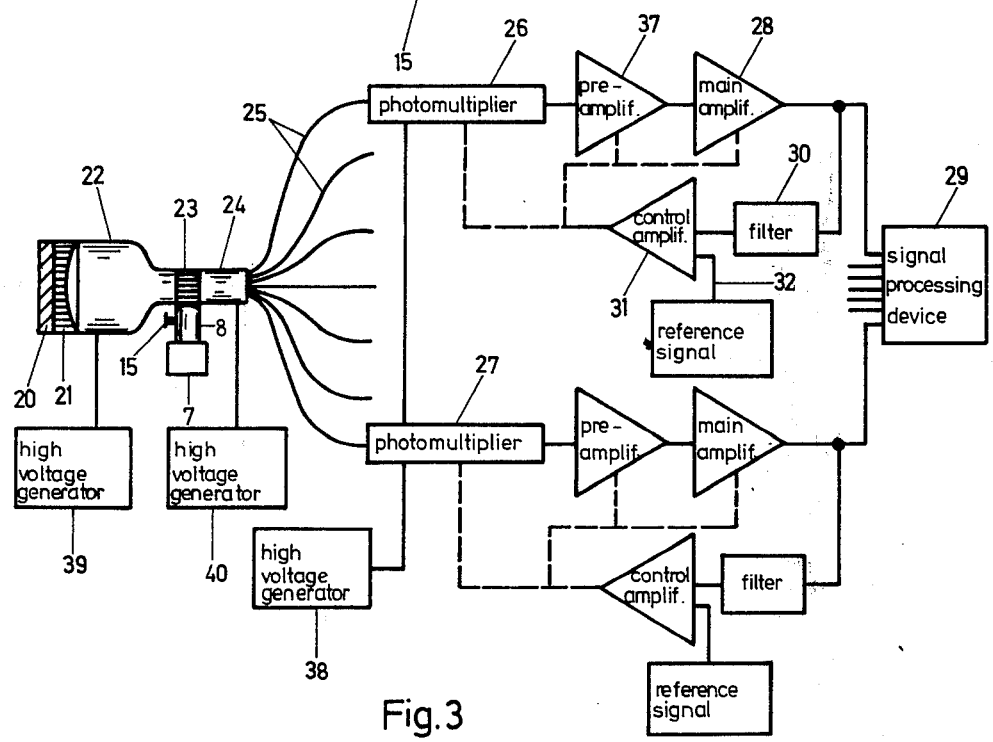
FIG. 3 is a circuit diagram of a device of the present invention having a photo multiplying device with several photo multipliers.

The embodiment of a gamma camera shown in FIG. 3 includes a scintillation crystal 20 which is coupled by a light conducting system 21 to the inlet screen of an image amplifier 22. The outlet screen of the image amplifier 22 is coupled by a further light conducting system 23 to the inlet of an image amplifier 24 the outgoing brightness of which is transmitted through light conductors 25 to inlets of several photo multipliers, of which two photo multipliers 26 and 27 are illustrated in FIG. 3.

Hereinafter is described the signal treating and control circuit pertaining to the photo multiplier 26.

The outgoing signal of the photo multiplier 26 is transmitted through a preamplifier 37 and a main amplifier 28 to a processing device 29. The signal processing device 29 can contain in known manner a monitor for reproducing the division of radioactive substances in a human body. The regulating circuit of the photo multiplier 26 is similar to the regulating circuit of the photo multiplier 1 according to FIG. 1. The outgoing signal of the main amplifier 28 is transmitted to a filter member 30 connected with a control amplifier 31 with a rated value inlet 32.

The regulating circuits connected with the other photo multipliers are constructed in the same manner as the above-described regulating circuit. Since each control amplifier has a separate rated value inlet the rated value of the amplification can be set individually for each photo multiplier. In this manner it is possible to balance non uniform illuminations of the inlet screen of the image amplifier 24 by the beta light in the box 7 which is coupled thereto by the screen 8 and light conducting system 23. The desired illumination is fixed once when the gamma camera is made. The signals at the rated value inlets of the control amplifier are set correspondingly. The light conducting system 25 permits a coordinate determination of brightness on the outlet screen and thus also on the inlet screen of the image amplifier 24.

For complete disclosure the high voltage supply 38 for the photo multiplier has been shown in FIG. 3. In the embodiment of FIG. 3 the amplification regulation cannot take place by acting upon the high voltage supply 38, since this high voltage supply would change at the same time the amplification of all photo multipliers. However, an amplification regulation through high voltage is possible when each photo multiplier is provided with its own high voltage supply. An individual amplification regulation is possible by action upon the preamplifier or the main amplifier. Furthermore, here a change in the dynode voltage according to FIG. 1 is also possible.

In the device of FIG. 3 the calibration key 15 is actuated for calibrating the device. The key causes the diaphragm to free the light current from beta light to the inlet of the image amplifier 24. After this key is actuated there is an automatic adaptation of the amplification of all photo multiplying devices to the desired rated value which is fixed once during the fixing by setting rated value signals at inlets 32 etc.

The beta light can also send light directly to the light conducting system 25.

When the illumination of the inlet of the image amplifier 24 by the beta light is uniform, within the framework of the present invention the same rated value signal can be supplied to all control amplifiers, namely, in that case it is possible to give up an individual setting of the individual rated value signals for the separate control amplifiers. Then the amplification regulation can also take place at the high voltage supply 38 for the photo multiplier or through high voltage supply 39 and 40 for the image amplifiers 22 and 24.

According to the present invention the screen 8 can be also eliminated. In that case there is a continuous regulation of amplification of the photo multiplier device. However, in that case the photo multipliers are continuously supplied with a direct signal which can be separated from working signal in capacitive coupling.

The device according to FIG. 1 can be used, for example, in combination with a scanner to determine the distribution of radioactive substances in the body of a patient or in combination with a static measuring device for radioactive rays emerging from a patient.

The gamma camera according to FIG. 3 makes it possible to determine at the same time throughout the entire feeling range the radioactive rays emerging from a patient and produced by introducing radioactive substances into his body. The orientation signals actuated by the treating device 29 for representing the distribution of radioactive substances in the patient's body, are produced in known manner by determining the outgoing signals of photo multipliers. A gamma camera of this type is the subject of German Pat. No. 1,614,439. Instead of two image amplifiers located one behind the other it is also possible to use a single image amplifier into the inlet of which sends rays the beta light.

Since the half value time of the radioactive gas used for the beta light is known, the brightness change of the beta light caused by decomposition of this gas can be compensated in that the giver or the givers for the rated value signal are programmed corresponding to the change in brightness of the beta light depending upon the time.

According to a further development of the present invention the screen 8 can be adjustable in such manner that in it the strength of the light current to the corresponding photo multiplying device is adjustable.

The present invention can be applied to all useable sections of the photo multiplying devices in the light measuring technology.

Figures 5, 6:
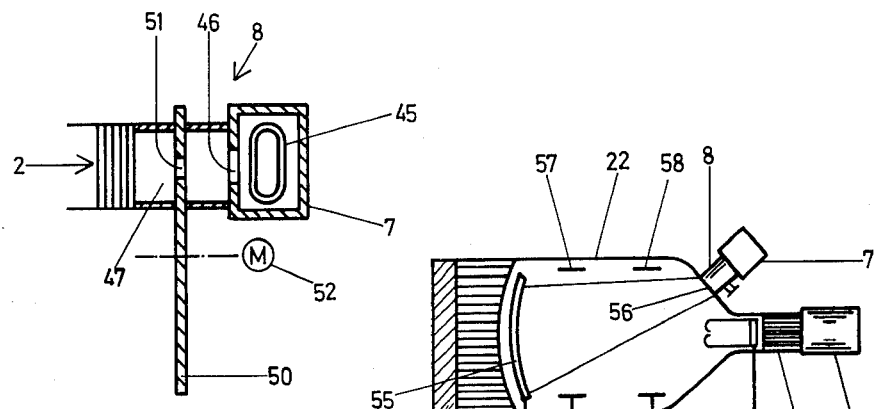
FIG. 5 is similar to FIG. 2 but shows a different construction.
FIG. 6 is a variant of the device shown in FIG. 3.
Figure 4:
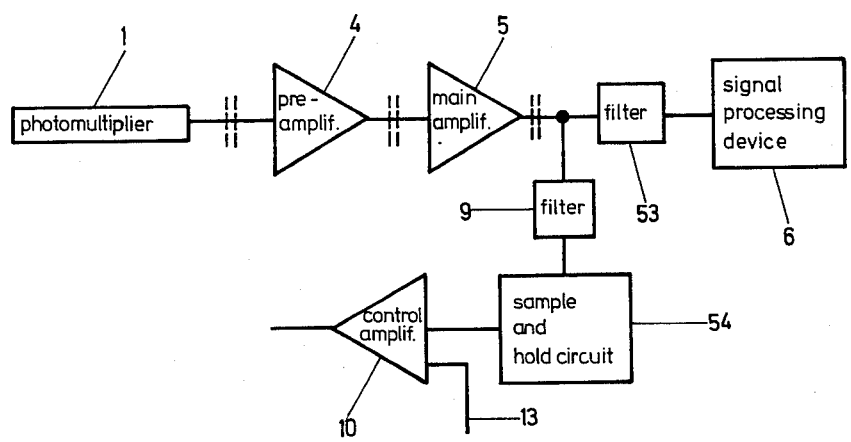
FIG. 4 is similar to FIG. 1 but shows a different construction.

FIGS. 4 and 5 show an embodiment of the present invention wherein the light flow through the tube 47 can be interrupted by a rotary disc 50 which has a hole 51 through which the light flow can pass when it extends through the tube 47. The drive of the disc 50 takes place through a motor 52 with constant rotation. Through the opening 51 the light current to the light conducting system 2 according to FIG. 1 is periodically interrupted, namely the inlet of the photo multiplier 1 is subjected to light impulses. Thus the outlet signal of the photo multiplier 1 and of the ampflifiers 4 and 5 receives impulses which correspond to these light impulses. The filter 53 prevents the transmission of these impulses to the signal treating device 6 and thus the filter 53 prevents the transmission of these impulses to the signal operating device 6 and thus an incorrectness of the useful signal. The filter 9 filters these impulses and transmits them to a feeling and holding circuit 54. The circuit 54 supplies the prevailing top value of these impulses and forms the actual value of the amplification of the photo multiplier device 1, 4 and 5. The amplification regulation takes place in the same manner as in FIG. 1, i.e. through a control amplifier 10.

Since the calibrating signal of the device of FIGS. 4 and 5 runs as an impulse, the impulse amplitude can be selected so high that it is close to the amplitude of the useful signal, without providing a too high average load of the photo multiplier 1 by the light impulses. A load which is too high would be produced when a continuing signal with this amplitude would be provided at the inlet of the photo multiplier 1, since then the amplification would change in an undesired manner due to the high incoming signal. However, since the average value of the incoming signal coming from beta light 45 during a key actuation of the light current can be kept small, the photo multiplier will not be so affected that its amplification will change in an undesirable manner. Nevertheless the impulse forming signal supplied by the filter 9 is so large as far as its top value is concerned that the drift of the amplifiers 4 and 5 and the offset voltage thus produced have actually no influence upon the actual value signal of the sampling and holding circuit 54.

In conclusion it can be stated concerning FIGS. 4 and 5, that the inlet of the photo multiplier 1 can be provided with light impulses of high intensity without there being an undesirable change in its amplification, since the average value of these light impulses can be kept small. Furthermore, it is possible to make the impulse amplitude of the outgoing signal of the amplifier 5 corresponding to the light impulses, as large as the impulse amplitude of the useful signal, so that the drift of amplifiers 4 and 5, i.e. the appearance of an outlet voltage in these amplifiers when the incoming signal is zero (offset voltage) actually has no effect upon the signal impulses produced by the light impulses, so that these impulses are not falsified. Due to the impulse-shaped outgoing voltage of the photo multiplier 1, a capacitive coupling of structural elements 1, 4, 5 and 53 can take place according to FIG. 4, so that the drift is eliminated, since the offset voltage appearing at the outlets of the amplifiers 4 and 5 when the incoming signal is zero, is not transmitted.

Filters 9 and 10 form a switch which transmits the useful signal to the signal processing device 6 and the calibrating signal to the control amplifier 10.

The device of FIGS. 4 and 5 can be operated for a short time for calibrating, when the tube 47 is normally closed by a further screen. Then the calibrating takes place by opening the tube 47 and starting the operation of the disc 50. However, the device according to FIGS. 4 and 5 is also suitable for continuous operation wherein the inlet of the photo multiplier 1 is continuously subjected to light impulses for amplification regulation. This device is also useable in connection with a gamma camera according to FIG. 3.

FIG. 6 shows a development of the device of the present invention according to FIG. 3, wherein the beta light in the box 7 sends rays through the screen device 8 directly to the image amplifier 22, namely upon its photocathode 55. For that purpose a small window 56 in the wall of the image amplifier 22 is made light transmitting and the screen device 8 is fixed in the range of this window 56 to the wall of the image amplifier 52. Thus beta light 45 in the box 7 illuminates the photocathode 55. The change of this light signal into electrical signals takes place according to FIG. 3 by the image amplifier chain 22, 24 and the photo multipliers.

FIG. 6 also shows ring-shaped electrodes 57 and 58 located in the image amplifier 22 as well as the voltage divider 59 for supplying voltage to these electrodes.

The useful signal is supplied to the image amplifier 22 from the scintillation crystal 20 through the light conducting system 21 while the signal for amplification regulation is formed by the illumination of the photocathode 55 by means of the beta light 45 in the box 7.

The motor 52 in FIG. 5 can be replaced by a device swinging the disc 50 so as to free periodically the light current through the tube 47.

I claim:

1. A device for maintaining constant the amplification of a photoelectric transducer arrangement in a gamma camera, comprising an image intensifier, a beta light at the inlet of said image intensifier and supplying uniform light thereto, a plurality of photomultipliers, a light-conducting system connecting said photomultipliers with the outlet of said image intensifier, a second image intensifier having an outlet connected with the inlet of the first-mentioned image intensifier, a scintillation crystal connected with the second-mentioned image intensifier, means comparing the direct voltage outgoing signal of each photomultiplier produced by the beta light with a rated value signal embodying the rated value of the amplification, and means varying the amplification so as to balance the direct voltage outgoing signal with the rated value signal.

2. A device in accordance with claim 1, comprising an adjustable screen located between said beta light and the inlet of said image intensifier for normally interrupting the flow of incoming light, and a calibration key actuating said screen for moving it into a position freeing the light flow.

3. A device in accordance with claim 1, comprising means setting individually the rated value signal for each photo multiplier.

* * * * *